US005262231A

United States Patent [19]

Aoki

[11] Patent Number: 5,262,231

[45] Date of Patent: Nov. 16, 1993

[54] TRANSFER SHEETS

[75] Inventor: Nobuyuki Aoki, Shizuoka, Japan

[73] Assignee: Tomoegawa Paper Co., Ltd., Tokyo, Japan

[21] Appl. No.: 775,429

[22] Filed: Oct. 15, 1991

[30] Foreign Application Priority Data

Oct. 22, 1990 [JP] Japan ................................ 2-281870

[51] Int. Cl.[5] ................................................ B32B 9/00

[52] U.S. Cl. .................................... 428/323; 428/195; 428/328; 428/329

[58] Field of Search ............ 428/195, 421, 403, 474.1, 428/500, 405, 324, 341, 323, 328, 329

[56] References Cited

U.S. PATENT DOCUMENTS 4,377,629 3/1983 Tarumi et al. ................... 428/474.7

4,479,997 10/1984 Masterson et al. ................ 428/212

FOREIGN PATENT DOCUMENTS 2512864 10/1975 Fed. Rep. of Germany .

3421494 12/1984 Fed. Rep. of Germany .

*Primary Examiner*—Patrick J. Ryan

*Assistant Examiner*—W. Krynski

*Attorney, Agent, or Firm*—Finnegan, Henderson, Farabow, Garrett & Dunner

[57] ABSTRACT

A transfer sheet includes a substrate and a coating layer. The coating layer is provided on the at least one face of the substrate, the coating layer including a binder and at least one metal oxide selected from the group consisting of magnesium oxide and aluminum oxide.

6 Claims, 1 Drawing Sheet

TRANSFER SHEETS

Background of the Invention

1. Field of the Invention

The present invention relates to transfer sheets for use in transferring a toner image obtained by development from a photoconductive element or an electrostatic recording element.

2. Prior Art

Heretofore, when conventional transfer sheets were to be used in a copy machine or a printer, there was a need to use transfer sheets of a uniform weight so as to produce satisfactory paper flow through the machine without jamming or otherwise disrupting operation.

In addition, the fixing strength between the sheet and the toner is partly dependent on the weight of the sheet. In particular, the fixing strength and the weight of the sheet are negatively correlated. In the case where the toner is transferred to the transfer sheet and fixed thereto at a given temperature, a sheet of low weight is liable to absorb most of the heat. For this reason, the melting of toner is facilitated and the toner can be induced to readily adhere to the fibers of the transfer sheet.

Accordingly, reduction in the weight of the transfer sheet is considered to contribute to the improvement of the fixing strength between the toner and the sheet; however, at the same time, the reduction in weight of the paper adversely affects the sheet-feeding property of the paper. Such transfer sheets having poor sheet-feeding properties are not acceptable for practical use in, for example, a copying machine or a printer. Therefore, reduction in sheet weight is limited as a method for improving the fixing strength between the transfer sheet and the toner.

SUMMARY OF THE INVENTION

Figure 1:
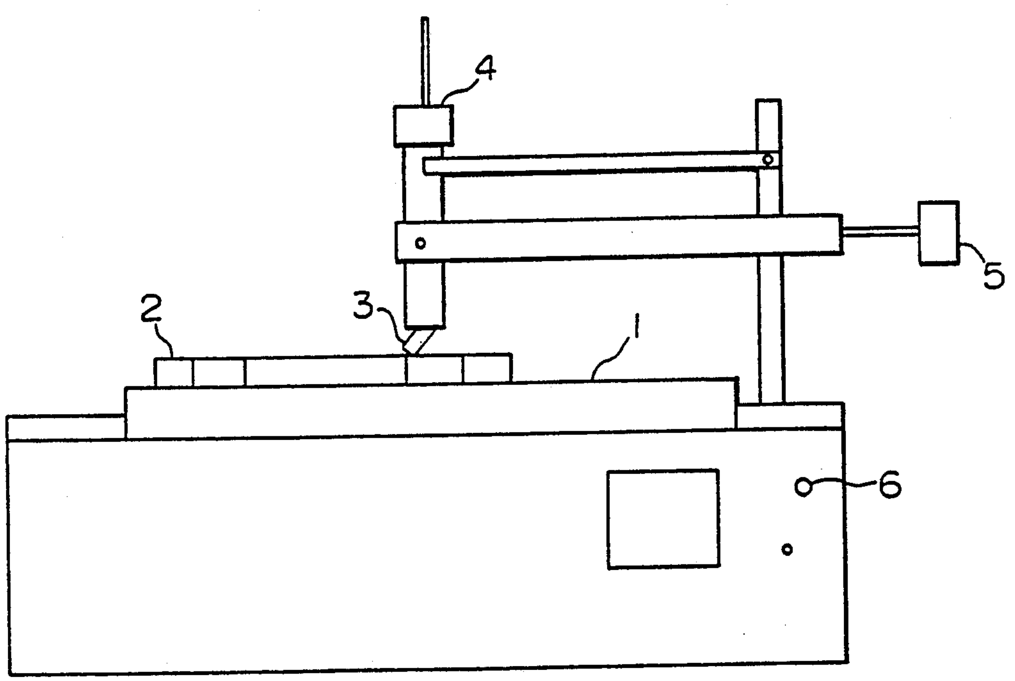
FIG. 1 is a schematic drawing of a testing machine for measuring the fixing strength between a toner and a transfer sheet.

In order to solve the problems described above, it is an object of the present invention to provide a transfer sheet having an improved fixing strength between the sheet and a toner.

One aspect of the present invention is directed to providing a transfer sheet comprising:

a substrate; and a coating layer provided on the at least one face of the substrate, the coating layer including a binder and at least one metal oxide selected from the group consisting of magnesium oxide and aluminum oxide.

The above objects, effects, features, and advantages of the present invention will become more apparent from the following descriptions of preferred embodiments thereof.

DETAILED DESCRIPTION OF THE INVENTION

A transfer sheet according to the present invention comprises: a substrate; a coating layer positioned on the at least one face of the substrate, the coating layer including magnesium oxide and/or aluminum oxide and a binder.

The magnesium oxide and/or aluminum oxide employed in the present invention are preferably present in the amount of 2 parts by weight to 45 parts by weight per 100 parts by weight of the substrate, more preferably in the amount of 5 parts by weight to 15 parts by weight per 100 parts by weight of the substrate.

If the amount of magnesium oxide and/or aluminum oxide is less than 2 parts by weight, there is a disadvantage in that the fixing of the toner is negligible. If the amount of magnesium oxide and/or aluminum oxide is increased, the fixing of the toner is improved. However, it is no appreciable further improvement when magnesium oxide and/or aluminum oxide are increased above 45 parts by weight per 100 parts by weight of the substrate. In addition, if the magnesium oxide and/or aluminum oxide are present in the amount of more than 45 parts by weight, the sheet-feeding property is not adequate; for example, two sheets are simultaneously fed during a sheet feeding step, and there is a high probability that the sheets will adhere to the heating roller during a toner fixing step.

As the substrate according to the present invention, any of the conventional papers (including synthetic papers) may be used. Films can be also employed.

The transfer sheet according to the present invention is produced by the steps of: preparing magnesium oxide and/or aluminum oxide, a binder, and a substrate; dissolving or dispersing magnesium oxide and/or aluminum oxide and the binder in water or an organic solvent to form a coating solution; coating the at least one face of the substrate with the coating solution to form a coated substrate; and drying the coated substrate.

A sheet may also be produced by mixing magnesium oxide and/or aluminum oxide with paper pulp.

Magnesium oxide and aluminum oxide are commercially available. Magnesium hydroxide and aluminum hydroxide, instead of magnesium oxide and aluminum oxide, respectively, can be employed in the coating solution.

A binder used in the present invention generally includes styrene - butadiene rubber, starch, and the like. The binder resin further includes a cellulose derivative such as ethyl cellulose, cellulose acetate, hydroxypropyl cellulose, nitro cellulose, cellulose acetate butylate, or cellulose acetate propionate; a vinylic polymer such as polyvinyl chloride, vinyl chloride - vinyl acetate - vinyl alcohol copolymer, ethylene - vinyl acetate copolymer, ethylene - vinyl alcohol copolymer, or ethylene - vinyl chloride copolymer; a polystyrene such as polystyrene, or styrene - butadiene - acrylonitrile copolymer; polyacrylic acid ester, polymethacrylic acid ester, a copolymer of polyacrylic acid ester and polymethacrylic acid ester; butyral resin, epoxy resin, alkyd resin, phenol resin, saturated polymerized polyester resin, fluorine-containing resin, polycarbonate, polyallylate, polysulfone, polyether sulfone, aromatic polyester, polyphenylene ether, or acrylonitrile - chlorinated polyethylene - styrene copolymer.

The magnesium oxide and/or aluminum oxide used in the coating may preferably be present in the amount of 7 parts by weight to 30 parts by weight per 100 parts by weight of binder.

An organic solvent used in the coating solution includes methanol, ethanol, isopropanol, benzene, toluene, xylene, methyl acetate, ethyl acetate, isobutyl acetate, acetone, 2-butanone, 4-methyl-2-pentanone, cyclohexanone, tetrahydrofuran, dioxane, methylene chloride, chloroform, 1,2-dichloroethane, 1,1,1-trichloroethane, chlorobenzene, hexane, heptane, cyclohexane, dimethylacetamide, dimethylsulfoxide, or a mixture of water and said organic solvent.

A coating solution is prepared by dispersing or dissolving magnesium oxide and/or aluminum oxide and the binder in the solvent. The nonvolatile content of the coating solution is usually present in the amount of 18% to 35%.

The coating solution preferably covers the substrate so that after drying the nonvolatile content of the coating solution is present in the amount of 30 g to 150 g per $m^2$ of the substrate.

EXAMPLES

The present invention will be explained in detail hereinbelow with reference to examples. In the examples, all "parts" designate "parts by weight".

I. Preparation of a coating solution of aluminum oxide

A mixture of aluminum oxide of 100 parts, water of 150 parts, and a 10% solution of $Na_3PO_4$ of 2 parts as a dispersion agent was mixed in a homogenizer at 10,000 rpm for 10 minutes to form a suspension. A styrene-butadiene rubber (hereinafter, abbreviated as "SBR") solution of 17.3 parts having a nonvolatile content of 20%, and a starch solution of 37.5 parts having a nonvolatile content of 49%, were added to the dispersion of 70 parts, and the mixture was stirred to obtain a coating solution of aluminum oxide.

II. Preparation of a coating solution of magnesium oxide

A mixture of magnesium oxide of 100 parts, water of 150 parts, and a 10% solution of $Na_3PO4$ of 2 parts as a dispersion agent was mixed by a homogenizer at 10,000 rpm for 10 minutes to form a suspension. An SBR solution of 15.3 parts having a nonvolatile content of 20%, and a starch solution of 37.5 parts having a nonvolatile content of 49%, were added to the dispersion of 58.3 parts, and the mixture was stirred to obtain a coating solution of magnesium oxide.

III Substrate

A paper having a basis weight of 64 $g/m^2$ and a thickness of 100 μm was employed as the substrate in the following examples.

Example E1 (Examples E1-1 to E1-4)

A transfer sheet (Example E1-1) including magnesium oxide of 2 parts per 100 parts of a paper substrate was produced by coating a paper, "Siraoi" (produced by Daishowa Paper Manufacturing CO., LTD.,) as the paper substrate, with the coating solution of magnesium oxide described above.

Other transfer sheets (Example E1-2, Example E1-3, and Example E1-4), including respectively magnesium oxide of 5, 10, and 45 parts per 100 parts of the paper substrate, were produced by repeating the same procedure as described above, except that the amount of magnesium oxide used in each sheet was 5, 10, or 45 parts, instead of the 2 parts used in Example E1-1.

Comparative Example C1 (Comparative Examples C1-1 to C1-3)

Comparative transfer sheets (Comparative Example C1-1, Comparative Example C1-2, and Comparative Example C1-3), including respectively magnesium oxide of 0, 1, and 50 parts per 100 parts of the paper substrate, were produced by repeating the same procedure as described in Example E1, except that the amount of magnesium oxide used in each sheet was 0, 1, or 50 parts, instead of the 2 parts used in Example E1-1.

Example E2 (Examples E2-1 to E2-4)

A transfer sheet (Example E2-1) including magnesium oxide of 2 parts per 100 parts of a paper substrate was produced by coating a paper, "Tomoe River" (produced by Tomoegawa Paper CO., LTD.,) as the paper substrate, with the coating solution of magnesium oxide described above.

Other transfer sheets (Example E2-2, Example E2-3, and Example E2-4), including respectively magnesium oxide of 5, 10, and 45 parts per 100 parts of the paper substrate, were produced by repeating the same procedure as described above, except that the amount of magnesium oxide used in each sheet was 5, 10, or 45 parts, instead of the 2 parts used in Example E2-1.

Comparative Example C2 (Comparative Examples C2-1 to C2-3)

Comparative transfer sheets (Comparative Example C2-1, Comparative Example C2-2, and Comparative Example C2-3), including respectively magnesium oxide of 0, 1, and 50 parts per 100 parts of the paper substrate, were produced by repeating the same procedure as described in Example E2, except that the amount of magnesium oxide used in each sheet was 0, 1, or 50 parts, instead of the 2 parts used in Example E2-1.

Example E3 (Examples E3-1 to E3-4)

A transfer sheet (Example E3-1) including magnesium oxide of 2 parts per 100 parts of a paper substrate was produced by coating a paper, "Silver Form" (produced by Sanyo Kokusaku Pulp CO., LTD.,) as the paper substrate, with the coating solution of magnesium oxide described above.

Other transfer sheets (Example E3-2, Example E3-3, and Example E3-4), including respectively magnesium oxide of 5, 10, and 45 parts per 100 parts of the paper substrate, were produced by repeating the same procedure as described above, except that the amount of magnesium oxide used in each sheet was 5, 10, or 45 parts, instead of the 2 parts used in Example E3-1.

Comparative Example C3 (Comparative Examples C3-1 to C3-3)

Comparative transfer sheets (Comparative Example C3-1, Comparative Example C3-2, and Ccmparative Example C3-3), including respectively magnesium oxide of 0, 1, and 50 parts per 100 parts of the paper substrate, were produced by repeating the same procedure as described in Example E3, except that the amount of magnesium oxide used in each sheet was 0, 1, or 50 parts, instead of the 2 parts used in Example E3-1.

Example E4 (Examples E4-1 to E4-4)

A transfer sheet (Example E4-1) including magnesium oxide of 2 parts per 100 parts of a paper substrate was produced by coating a paper, "Bright Form" (produced by Daio Paper CO., LTD.,) as the paper substrate, with the coating solution of magnesium oxide described above.

Other transfer sheets (Example E4-2, Example E4-3, and Example E4-4), including respectively magnesium oxide of 5, 10, and 45 parts per 100 parts of the paper substrate, were produced by repeating the same procedure as described above, except that the amount of magnesium oxide used in each sheet was 5, 10 or 45 parts, instead of the 2 parts used in Example E4-1.

Comparative Example C4 (Comparative Examples C4-1 to C4-3)

Comparative transfer sheets (Comparative Examples C4-1, Comparative Example C4-2, and Comparative Example C4-3), including respectively magnesium oxide of 0, 1, and 50 parts per 100 parts of a paper substrate, were produced by repeating the same procedure as described in Example E4, except that the amount of magnesium oxide used in each sheet was 0, 1, or 50 parts, instead of the 2 parts used in Example E4-1.

Example E5 (Examples E5-1 to E5-4)

A transfer sheet (Example E5-1) including magnesium oxide of 2 parts per 100 parts of a paper substrate was produced by coating a paper, "Golden Form" (produced by Jujo Paper CO., LTD.,) as the paper substrate, with the coating solution of magnesium oxide described above.

Other transfer sheets (Example E5-2, Example E5-3, and Example E5-4), including respectively magnesium oxide of 5, 10, and 45 parts per 100 parts of a paper substrate, were produced by repeating the same procedure as described above, except that the amount of magnesium oxide used in each sheet was 5, 10 or 45 parts, instead of the 2 parts used in Example E5-1.

Comparative Example C5 (Comparative Examples C5-1 to C5-3)

Comparative transfer sheets (Comparative Example C5-1, Comparative Example C5-2, and Comparative Example C5-3), including respectively magnesium oxide of 0, 1, and 50 parts per 100 parts of the paper substrate were produced by repeating the same procedure as described in Example E5, except that the amount of magnesium oxide used in each sheet was 0, 1, or 50 parts, instead of the 2 parts used in Example E4-1.

Example 6 (Examples E6-1 to E6-4)

A transfer sheet (Example E6-1) including aluminum oxide of 2 parts per 100 parts of a paper substrate was produced by coating a paper, "Siraoi" (produced by Daishowa Paper Manufacturing CO., LTD.,) as the paper substrate, with the coating solution of aluminum oxide described above.

Other transfer sheets (Example E6-2, Example E6-3, and Example E6-4), including respectively aluminum oxide of 5, 10, and 45 parts per 100 parts of the paper substrate, were produced by repeating the same procedure as described above, except that the amount of aluminum oxide used in each sheet was 5, 10 or 45 parts, instead of the 2 parts used in Example E6-1.

Comparative Example C6 (Comparative Examples C6-1 to C6-3)

Comparative transfer sheets (Comparative Example C6-1, Comparative Example C6-2, and Comparative Example C6-3), including respectively aluminum oxide of 0, 1, and 50 parts per 100 parts of the paper substrate, were produced by repeating the same procedure as described in Example E6 except that the amount of aluminum oxide used in each sheet was 0, 1, or 50 parts, instead of the 2 parts used in Example E6-1.

Example E7 (Examples E7-1 to E7-4)

A transfer sheet (Example E7-1) including aluminum oxide of 2 parts per 100 parts of a paper substrate was produced by coating a paper, "Tomoe River" (produced by Tomoegawa Paper CO., LTD.,) as the paper substrate, with the coating solution of aluminum oxide described above.

Other transfer sheets (Examples E6-2, Example E6-3, and Example E6-4), including respectively aluminum oxide of 5, 10, and 45 parts per 100 parts of the paper substrate, were produced by repeating the same procedure as described above, except that the amount of aluminum oxide used in each sheet was 5, 10 or 45 parts, instead of the 2 parts used in Example E7-1.

Comparative Example C7 (Comparative Examples C7-1 to C7-3)

Comparative transfer sheets (Comparative Example C7-1, Comparative Example C7-2, and Comparative Example C7-3), including respectively aluminum oxide of 0, 1, and 50 parts per 100 parts of the paper substrate, were produced by repeating the same procedure as described in Example E7, except that the amount of aluminum oxide used in each sheet was 0, 1, or 50 parts instead of the 2 parts used in Example E7-1.

Example E8 (Examples E8-1 to E8-4)

A transfer sheet (Example E8-1) including aluminum oxide of 2 parts per 100 parts of a paper substrate was produced by coating a paper, "Silver Form" (produced by Sanyo Kokusaku Pulp CO., LTD.,) as the paper substrate, with the coating solution of aluminum oxide described above.

Other transfer sheets (Example E8-2, Example E8-3, and Example E8-4), including respectively aluminum oxide of 5, 10, and 45 parts per 100 parts of the paper substrate, were produced by repeating the same procedure as described above, except that the amount of aluminum oxide used in each sheet was 5, 10 or 45 parts, instead of the 2 parts used in Example E8-1.

Comparative Example C8 (Comparative Examples C8-1 to C8-3)

Comparative transfer sheets (Comparative Example C8-1, Comparative Example C8-2, and Comparative Example C8-3), including respectively aluminum oxide of 0, 1, and 50 parts per 100 parts of the paper substrate were produced by repeating the same procedure as described in Example E8, except that the amount of aluminum oxide used in each sheet was 0, 1, or 50 parts, instead of the 2 parts used in Example E8-1.

Example E9 (Examples E9-1 to E9-4)

A transfer sheet (Example E9-1) including aluminum oxide of 2 parts per 100 parts of a paper substrate was produced by coating a paper, "Bright Form" (produced by Daio Paper CO., LTD.,) as the paper substrate, with the coating solution of aluminum oxide described above.

Other transfer sheets (Example E9-2, Example E9-3, and Example E9-4), including respectively aluminum oxide of 5, 10, and 45 parts per 100 parts of the paper substrate, were produced by repeating the same procedure as described above, except that the amount of aluminum oxide used in each sheet was 5, 10 or 45 parts, instead of the 2 parts used in Example E9-1.

Comparative Example C9 (Comparative Examples C9-1 to C9-3)

Comparative transfer sheets (Comparative Example C9-1, Comparative Example C9-2, and Comparative Example C9-3), including respectively aluminum oxide of 0, 1, and 50 parts per 100 parts of the paper substrate, were produced by repeating the same procedure as described in Example E9, except that the amount of aluminum oxide used in each sheet was 0, 1, or 50 parts, instead of the 2 parts used in Example E9-1.

Example E10 (Examples E10-1 to E10-4)

A transfer sheet (Example E10-1) including aluminum oxide of 2 parts per 100 parts of a paper substrate was produced by coating a paper, "Golden Form" (produced by Jujo Paper CO., LTD.,) as the paper substrate, with the coating solution of aluminum oxide described above.

Other transfer sheets (Example E10-2, Example E10-3, and Example E10-4), including respectively aluminum oxide of 5, 10, and 45 parts per 100 parts of the paper substrate, were produced by repeating the same procedure as described above, except that the amount of aluminum oxide used in each sheet was 5, 10 or 45 parts, instead of the 2 parts used in Example E10-1.

Comparative Example C10 (Comparative Examples C10-1 to C10-3)

Comparative transfer sheets (Comparative Example C10-1,Comparative Example C10-2, and Comparative Example C10-3), including respectively aluminum oxide of 0, 1, and 50 parts per 100 parts of a paper substrate were produced by repeating the same procedure as described in Example E10, except that the amount of aluminum oxide used in each sheet was 0, 1, or 50 parts, instead of the 2 parts used in Example E10-1.

Tests

Fixing strength tests were carried out using the transfer sheets of Examples E1 to E10 according to the present invention and using transfer sheets of Comparative Examples C1 to C10.

I Preparation of toners

| Composition: | |
|---|---|
| Styrene - acrylic acid ester copolymer ($Mn = 0.5 \times 10^4$, $Mw = 9.7 \times 10^4$, $Mw/Mn = 19.4$) | 90 parts |
| Carbon black ("Carbon Black #40", produced by Mitsubishi Kasei Industries Co., Ltd.) | 5 parts |
| Polypropyrene resin ("Viscol 550P", produced by Sanyo Chemical Industries Co., Ltd.) | 3 parts |
| Charge control agent ("Spiron Black TRH", produced by Hodogaya Chemical Co., Ltd.) | 2 parts |

A mixture of the above-described composition was heat-melted and kneaded. The kneaded mixture was pulverized and classified by a milling machine to obtain a toner.

II. Test for fixing strength

A fixing strength test was carried out using each of the transfer sheets according to the present invention and the comparative transfer sheets obtained above by means of a copying machine ("BD-3810", produced by Toshiba Co., Ltd.) having a copying speed of 12 sheets per minute. A test image, "Gray scale" (produced by Kodak Co., Ltd.) having an image density of 0.4 to 1.4, was copied and the copied sheet on which the toner image had not yet completely fixed was ejected. The unfixed image was fixed to the transfer sheet at a processing speed of 45 mm/sec using a fixing machine having a roll diameter of 60 mm, a roll length of 320 mm, and a total pressure of 60 kg.

The fixing strength was measured using a test machine as shown in FIG. 1. In this test machine, a table 2 being movable back and forth was mounted on a base body 1. A sanding eraser 3 was placed in contact with the table 2. The contact pressure between the sanding eraser 3 and the table 2 was adjusted by means of a dead weight 4 and a load 5.

The image density was measured by process measurements Macbeth RD 914. Assuming that the image density of the fixed image is (A), and the image density of the image after being rubbed back and forth for three strokes of the test machine is (B), the fixing retention index (%) was calculated according to the following equation:

$$\text{Fixing retention index } (\%) = B/A \times 100.$$

The test results are shown in Table 1 and Table 2.

In addition, the amount of magnesium oxide or aluminum oxide in Table 1 or Table 2 is defined by parts by weight of magnesium oxide or aluminum oxide per 100 parts of the substrate.

TABLE 1

| Sample | Amount of Magnesium Oxide (parts by weight) | Temperature of heating roller (°C.) 140 | 150 | 160 | 170 | 180 | 190 |
|---|---|---|---|---|---|---|---|
| Comparative Example C1-1 | 0 | 39 | 42 | 48 | 60 | 69 | 76 |
| Comparative Example C1-2 | 1 | 39 | 43 | 48 | 59 | 70 | 77 |
| Example E1-1 | 2 | 45 | 51 | 63 | 72 | 80 | 85 |
| Example E1-2 | 5 | 60 | 72 | 83 | 88 | 93 | 100 |
| Example E1-3 | 10 | 65 | 77 | 88 | 96 | 97 | 100 |
| Example E1-4 | 45 | 69 | 80 | 92 | 98 | 100 | 100 |
| Comparative Example C1-3 | 50 | 70 | 80 | 93 | 97 | 100 | 99 |
| Comparative Example C2-1 | 0 | 35 | 41 | 47 | 62 | 70 | 77 |
| Comparative Example C2-2 | 1 | 37 | 40 | 50 | 61 | 70 | 76 |
| Example E2-1 | 2 | 44 | 49 | 60 | 70 | 82 | 90 |
| Example E2-2 | 5 | 65 | 76 | 80 | 85 | 94 | 100 |
| Example E2-3 | 10 | 66 | 79 | 83 | 95 | 96 | 100 |
| Example E2-4 | 45 | 70 | 83 | 87 | 97 | 99 | 100 |
| Comparative Example C2-3 | 50 | 73 | 82 | 90 | 98 | 98 | 100 |
| Comparative Example C3-1 | 0 | 38 | 43 | 52 | 60 | 69 | 73 |
| Comparative Example C3-2 | 1 | 38 | 43 | 53 | 60 | 70 | 72 |
| Example E3-1 | 2 | 44 | 48 | 60 | 75 | 79 | 83 |
| Example E3-2 | 5 | 60 | 68 | 76 | 87 | 96 | 100 |
| Example E3-3 | 10 | 63 | 72 | 86 | 91 | 98 | 100 |
| Example E3-4 | 45 | 68 | 74 | 89 | 95 | 99 | 100 |
| Comparative Example C3-3 | 50 | 70 | 77 | 90 | 96 | 100 | 100 |
| Comparative Example C4-1 | 0 | 40 | 47 | 59 | 68 | 79 | 83 |
| Comparative Example C4-2 | 1 | 39 | 47 | 58 | 69 | 78 | 80 |
| Example E4-1 | 2 | 47 | 52 | 64 | 77 | 83 | 89 |
| Example E4-2 | 5 | 62 | 71 | 79 | 86 | 97 | 100 |
| Example E4-3 | 10 | 65 | 76 | 85 | 92 | 99 | 100 |
| Example E4-4 | 45 | 69 | 79 | 88 | 95 | 100 | 100 |
| Comparative Example C4-3 | 50 | 69 | 81 | 88 | 94 | 99 | 100 |
| Comparative Example C5-1 | 0 | 41 | 49 | 53 | 62 | 74 | 81 |
| Comparative Example C5-2 | 1 | 40 | 49 | 54 | 60 | 77 | 84 |
| Example E5-1 | 2 | 49 | 53 | 66 | 75 | 80 | 90 |

TABLE 1-continued

| Sample | Amount of Magnesium Oxide (parts by weight) | Temperature of heating roller (°C.) 140 | 150 | 160 | 170 | 180 | 190 |
|---|---|---|---|---|---|---|---|
| Example E5-2 | 5 | 58 | 65 | 75 | 87 | 94 | 100 |
| Example E5-3 | 10 | 62 | 78 | 84 | 92 | 99 | 100 |
| Example E5-4 | 45 | 68 | 81 | 81 | 95 | 98 | 100 |
| Comparative Example C5-3 | 50 | 69 | 80 | 86 | 95 | 100 | 99 |

TABLE 2

| Sample | Amount of Aluminum Oxide (parts by weight) | Temperature of heating roller (°C.) 140 | 150 | 160 | 170 | 180 | 190 |
|---|---|---|---|---|---|---|---|
| Comparative Example C6-1 | 0 | 45 | 52 | 56 | 66 | 76 | 80 |
| Comparative Example C6-2 | 1 | 44 | 53 | 56 | 65 | 77 | 82 |
| Example E6-1 | 2 | 49 | 58 | 68 | 77 | 84 | 89 |
| Example E6-2 | 5 | 59 | 63 | 74 | 81 | 93 | 99 |
| Example E6-3 | 10 | 63 | 75 | 86 | 94 | 98 | 100 |
| Example E6-4 | 45 | 66 | 80 | 88 | 96 | 98 | 100 |
| Comparative Example C6-3 | 50 | 65 | 81 | 89 | 96 | 98 | 100 |
| Comparative Example C7-1 | 0 | 38 | 43 | 49 | 65 | 78 | 87 |
| Comparative Example C7-2 | 1 | 37 | 40 | 51 | 66 | 78 | 88 |
| Example E7-1 | 2 | 44 | 53 | 62 | 73 | 87 | 94 |
| Example E7-2 | 5 | 61 | 68 | 78 | 86 | 95 | 100 |
| Example E7-3 | 10 | 65 | 72 | 80 | 88 | 97 | 100 |
| Example E7-4 | 45 | 70 | 75 | 82 | 90 | 99 | 100 |
| Comparative Example C7-3 | 50 | 72 | 75 | 81 | 91 | 99 | 100 |
| Comparative Example C8-1 | 0 | 40 | 43 | 52 | 67 | 79 | 90 |
| Comparative Example C8-2 | 1 | 41 | 44 | 51 | 66 | 79 | 91 |
| Example E8-1 | 2 | 51 | 53 | 66 | 78 | 85 | 94 |
| Example E8-2 | 5 | 60 | 67 | 76 | 85 | 94 | 99 |
| Example E8-3 | 10 | 63 | 71 | 84 | 91 | 99 | 100 |
| Example E8-4 | 45 | 67 | 76 | 88 | 95 | 100 | 100 |
| Comparative Example C8-3 | 50 | 69 | 77 | 87 | 95 | 100 | 100 |
| Comparative Example C9-1 | 0 | 45 | 50 | 55 | 68 | 80 | 90 |
| Comparative Example C9-2 | 1 | 44 | 50 | 53 | 70 | 82 | 92 |
| Example E9-1 | 2 | 50 | 61 | 59 | 75 | 87 | 96 |
| Example E9-2 | 5 | 65 | 74 | 81 | 91 | 98 | 100 |
| Example E9-3 | 10 | 68 | 76 | 84 | 94 | 99 | 100 |
| Example E9-4 | 45 | 72 | 79 | 85 | 96 | 100 | 100 |
| Comparative Example C9-3 | 50 | 72 | 80 | 86 | 97 | 100 | 100 |
| Comparative Example C10-1 | 0 | 37 | 49 | 57 | 68 | 78 | 89 |
| Comparative Example C10-2 | 1 | 37 | 50 | 57 | 69 | 78 | 88 |
| Example E10-1 | 2 | 53 | 62 | 64 | 74 | 82 | 96 |
| Example E10-2 | 5 | 63 | 72 | 78 | 85 | 94 | 99 |
| Example E10-3 | 10 | 66 | 75 | 83 | 90 | 96 | 100 |
| Example E10-4 | 45 | 72 | 79 | 86 | 94 | 98 | 100 |
| Comparative Example C10-3 | 50 | 73 | 80 | 85 | 93 | 99 | 100 |

As is clear from the results shown in Table 1 and Table 2, the transfer sheets according to the present invention exhibit superior fixing strength at various temperature levels of the heating roller.

The present invention has been described in detail with respect to embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A transfer sheet comprising:

a substrate; and a coating layer provided on at least one face of the substrate, the coating layer including a binder and at least one metal oxide selected from the group consisting of magnesium oxide and aluminum oxide, wherein said at least one metal oxide selected from the group consisting of magnesium oxide and aluminum oxide is present in the amount of 2 parts by weight to 45 parts by weight per 100 parts by weight of said substrate, and wherein said transfer sheet is capable of receiving a toner image from a photoconductive element or an electrostatic recording element.

2. A transfer sheet as recited in claim 1, wherein the at least one metal oxide selected from the group consisting of magnesium oxide and aluminum oxide is present in the amount of 5 parts by weight to 15 parts by weight per 100 parts by weight of the substrate.

3. A transfer sheet as recited in claim 1, wherein the at least one metal oxide selected from the group consisting of magnesium oxide and aluminum oxide is present in the amount of 7 parts by weight to 30 parts by weight per 100 parts by weight of the binder.

4. A transfer sheet as recited in claim 1, wherein the binder includes at least one member selected from the group consisting of styrene-butadiene rubber, starch, ethyl cellulose, cellulose acetate, hydroxypropyl cellulose, nitro cellulose, cellulose acetate butylate, cellulose acetate propionate, polyvinyl chloride, vinyl chloride - vinyl acetate - vinyl alcohol copolymer, ethylene - vinyl acetate copolymer, ethylene - vinyl alcohol copolymer, ethylene - vinyl chloride copolymer, polystyrene, styrene - butadiene - acrylonitrile copolymer, polyacrylic acid ester, polymethacrylic acid ester, a copolymer of polyacrylic acid ester and polymethacrylic acid ester, butyral resin, epoxy resin, alkyd resin, phenol resin, saturated polymerized polyester resin, fluorine-containing resin, polycarbonate, polyallylate, polysulfone, polyether sulfone, aromatic polyester, polyphenylene ether, and acrylonitrile - chlorinated polyethylene - styrene copolymer.

5. A transfer sheet produced by the successive steps of:

a) preparing a substrate, a binder, and at least one metal oxide selected from the group consisting of magnesium oxide and aluminum oxide wherein said at least one metal oxide selected from the group consisting of magnesium oxide and aluminum oxide is present in the amount of 2 parts by weight to 45 parts by weight per 100 parts by weight of said substrate;

b) dissolving or dispersing the at least one metal oxide selected from the group consisting of magnesium oxide and aluminum oxide, and the binder in a solvent to form a coating solution;

c) coating at least one face of the substrate with the coating solution to form a coated substrate; and d) drying the coated substrate.

6. A transfer sheet as recited in claim 5, wherein the at least one metal oxide selected from the group consisting of magnesium oxide and aluminum oxide is present in the amount of 5 parts by weight to 15 parts by weight per 100 parts by weight of the substrate.

* * * * *